United States Patent [19]
Frenkel et al.

[11] Patent Number: 5,870,690
[45] Date of Patent: Feb. 9, 1999

[54] JOINT INVERSION PROCESSING METHOD FOR RESISTIVITY AND ACOUSTIC WELL LOG DATA

[75] Inventors: Michael Frenkel; Alberto G. Mezzatesta; Kurt-M. Strack; Xiaoming Tang, all of Houston, Tex.; Keeva Vozoff, Kirribilli, Australia

[73] Assignee: Western Atlas International, Inc., Houston, Tex.

[21] Appl. No.: 794,896

[22] Filed: Feb. 5, 1997

[51] Int. Cl.⁶ ...................................................... G06F 19/00
[52] U.S. Cl. ............................................................... 702/7
[58] Field of Search ............................ 702/7, 11; 367/73, 367/9; 324/338, 339, 342, 343

[56] References Cited

U.S. PATENT DOCUMENTS

| | | | |
|---|---|---|---|
| 4,679,174 | 7/1987 | Gelfand | 367/73 |
| 4,817,062 | 3/1989 | De Buyl et al. | 367/73 |
| 5,142,472 | 8/1992 | Day | 702/7 |
| 5,144,245 | 9/1992 | Wisler | 702/7 |
| 5,210,691 | 5/1993 | Freedman et al. | 702/7 |
| 5,463,549 | 10/1995 | Dussan V. et al. | 702/7 |
| 5,675,147 | 10/1997 | Ekstrom et al. | 702/11 |
| 5,798,982 | 8/1998 | He et al. | 367/73 |

*Primary Examiner*—Donald E. McElheny, Jr.
*Attorney, Agent, or Firm*—Richard A. Fagin

[57] ABSTRACT

A method of joint inversion processing acoustic velocity and electrical resistivity well log data. The method includes generating an initial model of earth formations over an interval of interest. The initial model corresponds to earth formations for which the acoustic velocity and resistivity well log data have been measured. The initial model includes layers each having a geometry, a value of resistivity and a value of acoustic velocity. Acoustic velocity and resistivity data are synthesized based on the initial model. Differences are determined between the synthesized data and the measured data. The initial model is adjusted and the steps of synthesizing the log data and determining the differences are repeated until the differences reach a minimum, thereby generating a final model of the earth formations. The step of adjusting includes determining a coupling relationship between the acoustic velocity and the resistivity for the earth formations, and generating an inverse Jacobian matrix of sensitivity functions of the resistivity and acoustic velocity with respect to the geometry and the coupling relationship.

3 Claims, 2 Drawing Sheets

JOINT INVERSION PROCESSING METHOD FOR RESISTIVITY AND ACOUSTIC WELL LOG DATA

BACKGROUND OF THE INVENTION

1. Field of the Invention

The invention is related to the field of well log data processing. More specifically, the invention is related to methods of inversion processing of well log data to derive a parametric model of earth formations which would produce a well log instrument response similar to well log data actually measured within a wellbore drilled through the earth formations.

2. Description of the Related Art

Well logging instruments make measurements related to various physical properties of earth formations from within wellbores drilled through these earth formations. The physical properties can include, among other things, electrical resistivity, and acoustic propagation velocity in one or more modes of acoustic energy propagation. The actual values of the measurements made by the well logging instruments depend not only on the values of these physical parameters but also on the spatial distribution of the response of each well logging instrument. Consequently, the spatial distribution of earth formations having the particular values of the physical parameters also affects the measurements made by the well logging instruments.

A process known in the art for determining both the spatial distribution and the values of the physical properties of the earth formations is called inversion processing. Inversion processing is described, for example, in D. L. B. Jupp and K. Vozoff, Stable Iterative Methods for Geophysical Inversion, Geophysical Journal of the Royal Astronomical Society, vol. 42, pp. 957–976 (1975). Inversion processing is usually performed by generating an initial estimate, or model, of the values and of the spatial distribution of the physical properties of the earth formations through which the wellbore is drilled. Since the spatial distribution is generally known for the response of the particular logging instruments for which the inversion process is being performed, a synthetic set of instrument responses, or synthetic well log, can be generated from the initial model. If the initial model does not precisely represent the actual distribution of physical properties of the formations through which the wellbore is drilled, there will generally be some differences between the measured well log data and the synthetic well log. If there are significant differences between the synthetic well log and the measured well log, the initial model will be "adjusted", meaning that the spatial distribution and/or the values of the physical properties will be changed, and a new synthetic well log will be generated from the adjusted initial model. If the differences between the synthetic well log made from the adjusted model, and the measured log data are still significant, the steps of adjusting the model, generating the synthetic well log and comparing the newest synthetic well log to the measured well log are repeated until the differences between the synthetic and the measured well logs are minimized. The model as finally adjusted is then deemed to be a reasonable representation of the spatial distribution and the values of the physical properties of the earth formations.

As initially described by jupp and Vozoff, supra, inversion was "one-dimensional", meaning that the spatial distribution of the physical properties was deemed to be variable only along the axis of the wellbore. The earth formations did not change properties radially outward from the wellbore. Later advances in inversion processing enabled determining a spatial distribution of physical properties in both the axial and radial directions, this being so-called "two-dimensional" inversion.

A limitation to the inversion processing known in the art is that it is generally performed only for a single type of well log measurement. In certain instances, inversion processing data from different types of well logging instruments measuring the same earth formations may each result in a different finally adjusted model (wherein the differences between the synthetic well log and the measured well log are minimized). Differences between finally adjusted models for each type of well log instrument make it difficult to resolve the most likely spatial distribution of properties of the earth formations through which the wellbore is drilled.

One method to improve inversion processing is described in A. G. Mezzatesta et al, Improved Resolution of Reservoir Parameters by Joint Use of Resistivity and Induction Tools, Society of Professional Well Log Analysts, Houston, Tex., (1994). The method described in the Mezzatesta et al reference includes generating a single earth model which minimizes the differences between synthetic and measured well log data for a combination of galvanic and induction type electrical resistivity measurements run in the same wellbore (and consequently through the same earth formations). A drawback to the use of the method described in the Mezzatesta et al reference is that wellbore operators typically do not run both galvanic and induction type resistivity well logging instruments in the same wellbore for reasons of cost and operating efficiency. Further, wellbore conditions and earth formation resistivity values which are more suitably logged with induction well logging instruments can be undesirable for logging with typical galvanic well logging instruments, and vice versa. Consequently, the method described by Mezzatesta et al has not yet found wide commercial application.

Other types of well logging instruments are more commonly used in combination with either galvanic or induction well logging instruments, but as yet no inversion processing has been devised to make use of the various types of well log data available from the typical wellbore, primarily because the different well logging instruments measure fundamentally different physical properties of the earth formations. Accordingly, the invention is intended to provide a method of jointly inversion processing resistivity and acoustic well log data.

SUMMARY OF THE INVENTION

The invention is a method of joint inversion processing of acoustic velocity well log data and electrical resistivity well log data. The method includes generating an initial model of earth formations over an interval of interest. The initial model corresponds to earth formations for which the acoustic velocity and the resistivity well log data have been measured. The initial model includes layers each having a geometry consisting of a thickness and a radially located demarcation between physical properties of the earth formation. The demarcation typically separates the invaded zone from the uninvaded zone. Each layer includes at least one value of the resistivity and at least one value of the acoustic velocity. Acoustic velocity and resistivity data are then synthesized based on the initial model. Differences are determined between the synthesized well log data and the measured well log data. The initial model is adjusted, and the steps of synthesizing the log data and determining the differences between the synthesized log data and the measured log data are repeated until the differences reach a minimum. When the differences reach a minimum, a final model of the earth formations is thus determined. In a preferred embodiment, the differences can be determined to be at a minimum using the Levernberg-Marquardt algorithm.

In one embodiment of the invention, the step of adjusting the model includes determining a coupling relationship between the acoustic velocity and the resistivity for the particular earth formations being modeled, and generating an inverse Jacobian matrix of sensitivity functions of the resistivity and acoustic velocity with respect to the geometry and the coupling relationship.

DESCRIPTION OF THE PREFERRED EMBODIMENT

The invention makes use of well log measurements generated by electrical resistivity instruments and by acoustic propagation velocity (travel time) instruments. Well logging instruments which can be used to make the measurements needed for the process of the invention, and the methodology of generating the measurements from within wellbores drilled through earth formations, are well known in the art. The resistivity and acoustic well logging instruments are preferably operated in the wellbore at the same time, but this is not necessary for the process of the invention and so should not be construed as a limitation on the invention. It is only necessary to have acoustic and resistivity measurements which are made over the same interval in the wellbore, or to have estimates of acoustic and resistivity values which can be derived from other types of well logs, or derived from log interpretation techniques known in the art. These measurements and/or estimates will be collectively referred to hereinafter as well log measurements.

An interval of interest can be selected from the well log measurements. The interval of interest can be used to generate an initial model of the physical properties of the earth formations. The interval of interest can be selected manually by the system operator, or automatically using selection criteria known in the art such as calculations of low "water saturation" in particular earth formations, or intervals having low natural gamma ray radiation values. These examples are not meant to be an exhaustive list of automatic selection criteria.

Figure 1:
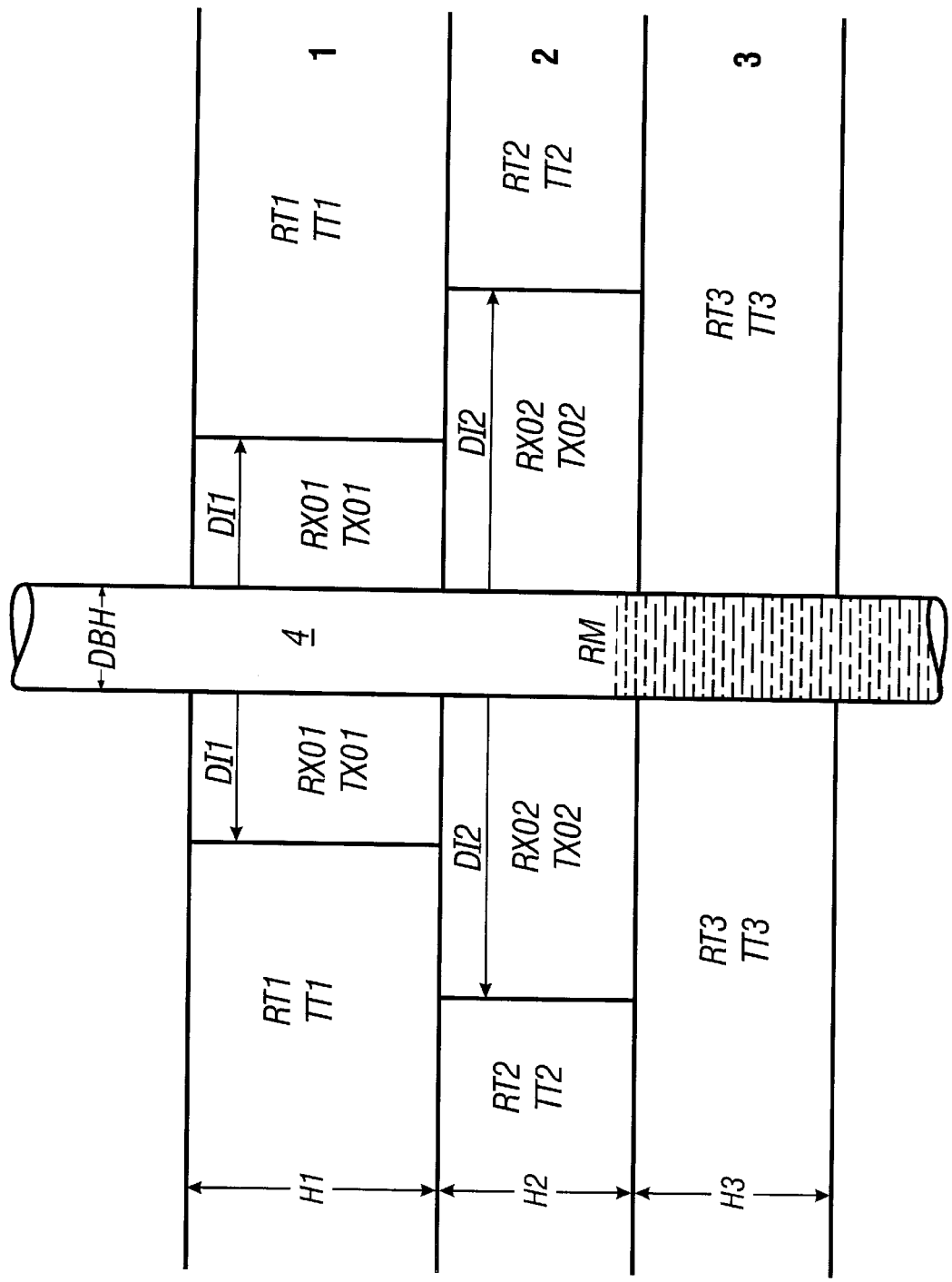
FIG. 1 shows a generalized representation of an earth model as is generated by the process of the invention.

A generalized representation of an earth model is shown in FIG. 1. The wellbore is shown roughly in the center of the drawing at 4. For making acoustic measurements, as is known in the art, the wellbore 4 is typically filled with a liquid. Since the liquid is quite commonly a wellbore drilling suspension called "drilling mud", in FIG. 1 the liquid is shown as having an electrical resistivity value represented by RM. The diameter of the wellbore, shown as DBH, can be determined from caliper measurement. Alternatively, in the absence of caliper measurement, the size of a drill bit used to drill the wellbore 4 can be used in substitution for the wellbore diameter DBH. The liquid resistivity RM in the vicinity of the intervals of interest can be determined using measurements of liquid resistivity made at the earth's surface which are then temperature corrected by methods known in the art. Wellbore diameter DBH and liquid resistivity RM are typically used for making environmental corrections to the well log measurements as made by the instruments, as is known in the art.

Earth formations penetrated by the wellbore are shown as layers 1, 2 and 3. The number of layers in the initial model, and the axial location (along the axis of the wellbore 4) of the boundaries between the layers, can be selected manually by the system operator from visual observation of the well log measurements, or automatically by using selection criteria including changes in natural gamma ray radiation. Other layer selection criteria are well known in the art. The layer selection criteria described herein are not meant to be an exhaustive list of such layer selection methods.

In the model shown in FIG. 1, layer 1 includes a thickness H1, a resistivity of a zone radially proximal to the wellbore 4 called the "flushed zone" which has resistivity RXO1, and an acoustic velocity TXO1. Layer 1 also has an uninvaded zone which includes resistivity RT1, and an acoustic velocity TT1. The demarcation between the flushed zone and the uninvaded zone is shown generally as a single boundary, but it is to be understood that other representations of the demarcation known in the art, such as "transition zones" can also be used if the resistivity measurements appropriate to the resolution of transition zone earth models are available. Such measurements could include multiple depth of investigation instruments such as the dual induction/shallow focused log or the dual laterolog/micro spherically focused log, as is known in the art.

Layer 2 includes resistivity and acoustic velocity zones shown as RXO2, TXO2 and RT2, TT2. Layer 3 is shown in FIG. 1 as having substantially no flushed zone, whereby TT3 and RT3 occupy the entire radial span of layer 3. The thicknesses of layers 2 and 3 are represented, respectively, by H2 and H3. The radial distance to the demarcation between the uninvaded zones and the flushed zones in layers 1 and 2 are shown, respectively, by Dl1 and Dl2. The number of layers shown in FIG. 1 and the type of radial demarcation is meant to serve only as an example of an initial earth model. The actual number of layers and the positions of the radial demarcations will depend, as previously explained, on the type and number of measurements made by the well logging instruments. The initial values for the resistivity and acoustic velocity in the layers (RXO1, RT1, TXO1, TT1, RXO2, RT2, TXO2, TT2, RT3, TT3) can be selected manually by the system operator or automatically from the well log measurements.

The initial earth model can be used to generate synthetic well log measurements for both the resistivity and the acoustic well logging instruments. The resistivity measurements can be synthesized using a two-dimensional modeling routine described, for example, in T. Tamarchenko and V. Druskin, *Fast Modeling of Induction and Resistivity Logging in the Model with Mixed Boundaries*, Transactions of the 34th annual well logging symposium, Society of Professional Well Log Analysts, Houston, Tex. (1993). The response of the acoustic logging instrument can then be synthesized. Synthesizing an acoustic log from the initial earth model can be performed according to well known processing methods, including one described, for example, in D. L. B. Jupp and K. Vozoff, *Stable Iterative Methods for Geophysical Inversion*, Geophysical Journal of the Royal Astronomical Society, vol. 42, pp. 957–976 (1975). If the acoustic logging instrument is of a type which would enable generating a two-dimensional model of the earth formations, then a modeling routine described in, B. E. Hornby, *Tomographic Reconstruction of Near-Borehole Slowness Using Refracted Sonic Arrivals*, Geophysics, vol. 58, pp.

1726–1738, Society of Exploration Geophysicists (1993), can be used to generate the synthetic acoustic log.

Differences can then be calculated, over the interval of interest, between the measurements made by the well logging instruments and the synthetic well logs made by the modeling routines. The differences can be summed to generate an objective function such as one described by the following expression:

$$OBJ(P_A, P_R, P_G) = \sum_{n=1}^{N_A} \frac{[T_s(n) - T_m(n)]^2}{\sigma_A^2(n)} + \sum_{n=1}^{N_R} \frac{[R_s(n) - R_m(n)]^2}{\sigma_R^2(n)} + \sum_{n=1}^{N_C} \frac{[C_n(P_A, P_R)]^2}{\sigma_C^2(n)} \quad (1)$$

where $P_A$, $P_R$ and $P_G$ represent, respectively, the earth model parameters for the acoustic travel time (generally the inverse of acoustic velocity), resistivity and the model layer geometries (such as H1, Dl1, etc. and collectively referred to as the "geometry" of the model). $N_A$ and $N_R$ represent the total number of acoustic and resistivity measurements, respectively. $T_s$ and $T_m$ represent the synthetic and the measured acoustic travel time values; $R_s$ and $R_m$ represent the corresponding resistivity values. $\sigma^2_A(n)$ and $\sigma^2_R(n)$ represent, respectively, the variance of the n-th acoustic and resistivity measurement.

If the value of the objective function exceeds a predetermined threshold, then the model parameters, $P_A$, $P_R$ and $P_G$, can be adjusted and new synthetic well log data can be calculated using the modeling routines previously described. The value of the threshold will depend on the type of resistivity and acoustic measurements being synthesized, as well as whether the system operator has imposed external constraints on the model, such as a limit on the number of layers which can be used in a particular earth model. The process of adjusting the model parameters, resynthesizing the well log data, and comparing the synthetic response to the measured well log data continues until either the objective function value falls below the predetermined threshold or the value of the objective function reaches a minimum. Methods for determining the minimum value of the objective function are known in the art and include, among others, the Levenberg-Marquardt algorithm (Lines & Treitel (1984)). The actual method for determining the minimum value of the objective function is not intended to be a limitation on the invention.

As will be explained further, the expressions $C_n (P_A, P_B)$, which form the elements of the last summation in equation (3), represent coupling or correlation functions between the acoustic and the resistivity parameters of the modeled earth formations. The correlations can be used, in a manner which will be further explained, to determine the magnitude of the individual adjustments made to the model parameters in each step of adjustment when determining a final adjusted earth model.

The values of the model parameters which cause the value of the objective function to be reach a minimum are generally the values for the model parameters $P_A$, $P_R$ and $P_G$ which most closely approximate, within the limits of the resolution of the geometry of the model, the values and the spatial distribution of the physical properties of the earth formations penetrated by the wellbore 4.

Figure 2:
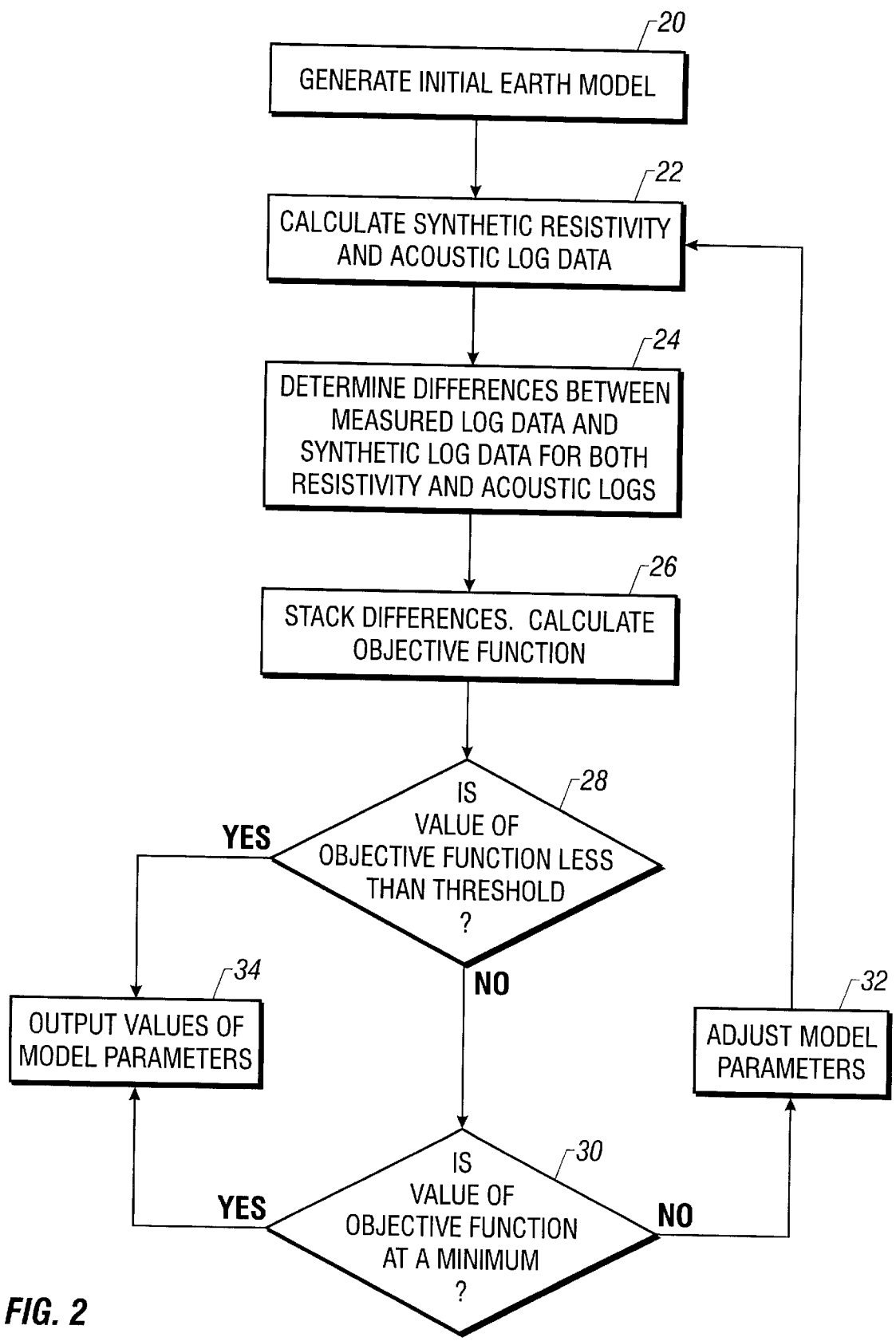
FIG. 2 shows a flow chart which outlines the process of the invention.

A flow chart which outlines the process of the invention is shown in FIG. 2. The initial earth model is generated at 20. The initial earth model is used to generate synthetic acoustic and resistivity logs at 22. Differences between the measured and synthetic logs are calculated at 24. The differences are summed at 26 and a value of the objective function is calculated. The path taken at decision box 28 depends on whether the value of the objective function is less than the threshold value. If value of the objective function is less than the threshold value, then the initial earth model is determined to be the model most representative of the earth formations and the process can be stopped, as shown at 32, or a new interval of interest can be selected and processed. If the objective function exceeds the threshold, shown leading to decision box 30, the path taken then depends on whether the value of the objective function is at a minimum. If the value of the objective function is at a minimum, then the parameters selected for the earth model can be output since they are most representative of the earth formations, as shown at 34. If the objective function is not at a minimum, then the model parameters can be adjusted as shown at 32, the log data resynthesized, and the a value of the objective function can be calculated. This process can be repeated until either the objective function reaches a minimum or falls below the threshold, in which case the model parameters are those most representative of the earth formations, as shown at 34.

In the invention, the step of adjusting the model parameters, shown at 32, can be performed by an iterative process. Adjustment values for the acoustic travel time, the resistivity and the location of the axial layer boundaries and the radial demarcations, respectively, $\delta P_A$, $\delta P_R$ and $\delta P_G$, can be calculated according to the expression:

$$\begin{vmatrix} \delta P_A \\ \delta P_R \\ \delta P_G \end{vmatrix} = J^+ \begin{vmatrix} \Delta T \\ \Delta R \end{vmatrix} \quad (2)$$

where $\Delta T$ (equal to $T_s - T_m$) represents the difference between the synthetic and measured acoustic log values, and $\Delta R$ (equal to $R_s - R_m$) represents the difference between the synthesized and measured resistivity values. The notation $J^+$ represents a generalized inverse of a sensitivity (or Jacobian) matrix. For a combination of resistivity and acoustic well log data, the Jacobian matrix can be shown by the following expression:

$$J = \begin{vmatrix} \frac{\partial T_S}{\partial P_A} & 0 & \frac{\partial T_S}{\partial P_G} \\ 0 & \frac{\partial R_S}{\partial P_R} & \frac{\partial R_S}{\partial P_G} \\ \frac{\partial C}{\partial P_A} & \frac{\partial C}{\partial P_S} & 0 \end{vmatrix} \quad (3)$$

The expression in equation (3) contains six submatrices. The $\partial T_s$ submatrices represent sensitivity matrices for the synthesized acoustic log data with respect to the acoustic velocity and the geometric parameters. Similarly, the $\partial R_s$ submatrices represent the sensitivity of the synthesized resistivity with respect to resistivity and the geometry parameters. The $\partial C$ submatrices represent the correlation, or coupling, relationship between the acoustic and the resistivity model parameters. If such a relationship exists for particular earth formations, then the values of the respective sensitivity matrices for the coupling relationships can be entered into the expression in equation (3). If no such relationship between the acoustic and resistivity parameters exists, then the values of the two correlation submatrices can be set to zero.

The coupling relationship can be derived from a number of different sources, for example, cross-plots of resistivity with respect to acoustic travel time which can be made from the measured well log data or from other well logs run in similar earth formations in the same geographic location as the well logs being processed according to the invention. The inversion process can be made to converge much more rapidly using the coupling relationship than without it. Consequently the combined inversion processing routine of the invention can provide improved speed of performance over methods of the prior art.

Another benefit of using the coupling relationship is that the acoustic travel time in the uninvaded zone may be determined with greater accuracy. Many acoustic well logging instruments determine acoustic log data from measurements of acoustic energy propagated substantially along the wall of the wellbore. In such cases the acoustic velocity in the uninvaded zone can be determined by extrapolating the acoustic travel time determined in the invaded zone. The extrapolation is based on the coupling relationship with respect to the resistivity and on the resistivity of the uninvaded zone as determined by inversion processing.

Those skilled in the art will readily devise other embodiments of the invention which do not depart from the spirit of the invention as disclosed herein. Accordingly, the invention should be limited in scope only by the attached claims.

What is claimed is:

1. A method of joint inversion processing acoustic velocity and resistivity well log data measured in a wellbore drilled through earth formations, comprising:

generating an initial model of said earth formations, said initial model comprising layers each having a geometry including a thickness and a radial demarcation of physical properties, said layers each including at least one value of said resistivity and at least one value of said acoustic velocity;

synthesizing said acoustic velocity and resistivity data based on said initial model;

determining differences between said synthesized data and said measured data; and adjusting said initial model and repeating said step of synthesizing said data until said differences reach a minimum, thereby generating a final model of said earth formations.

2. The method as defined in claim 1 wherein said step of adjusting said initial model comprises iteratively incrementing said resistivity, said acoustic velocity and said geometry, said iterative incrementing including determining a coupling relationship between said acoustic velocity and said resistivity for said earth formations.

3. The method as defined in claim 2 wherein said iterative incrementing comprises generating an inverse jacobian matrix of sensitivity functions of said acoustic velocity and said resistivity with respect to said geometry.

* * * * *